Patented Aug. 9, 1938

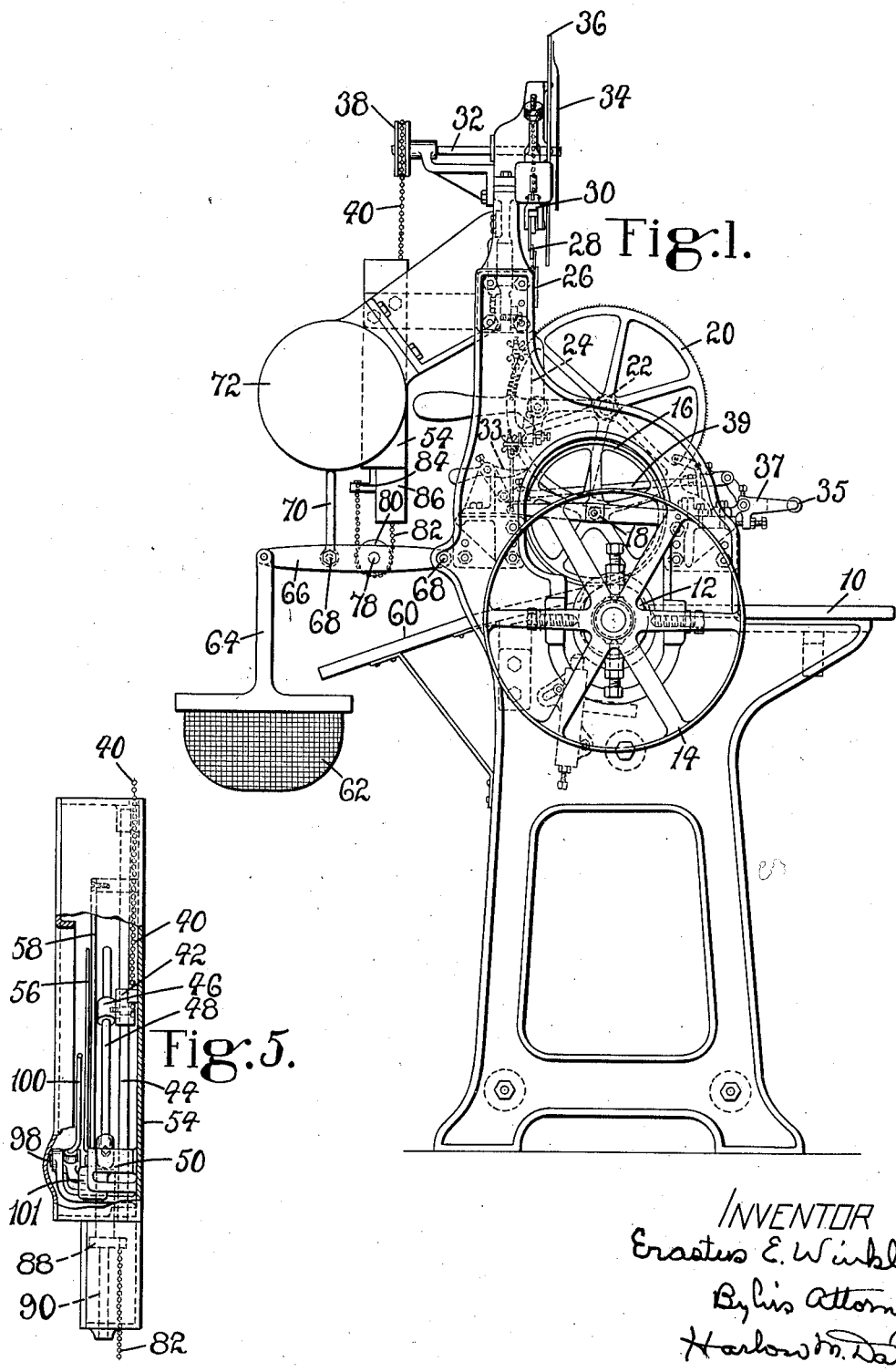

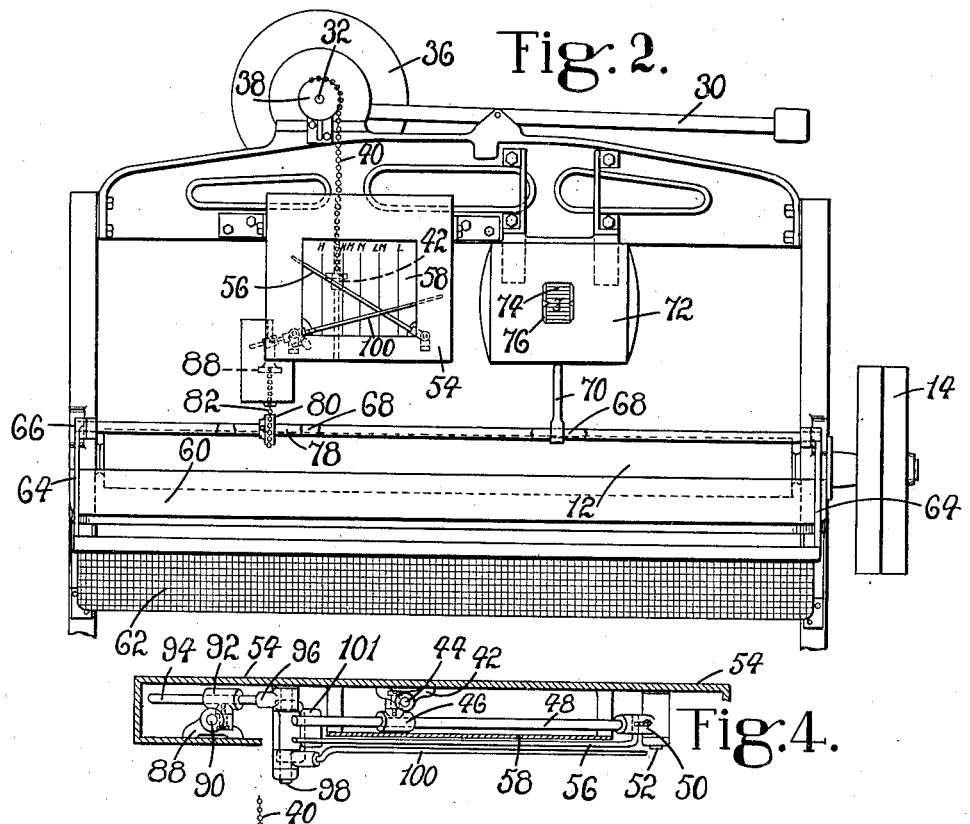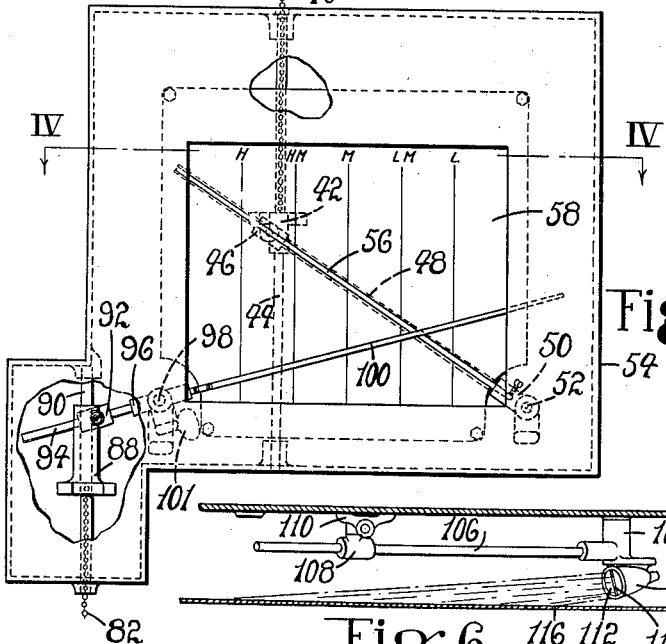

2,125,973

UNITED STATES PATENT OFFICE 2,125,973

MEASURING MACHINE

Erastus E. Winkley, Lynn, Mass., assignor to United Shoe Machinery Corporation, Paterson, N. J., a corporation of New Jersey Application June 30, 1936, Serial No. 88,181

8 Claims. (Cl. 73—151)

This invention relates to machines for measuring dimensions of sheet materials. While the invention is illustrated by reference to a machine for measuring the superficial area and the thickness dimensions of hides and skins, it is to be understood that the invention and various important features thereof may have other applications and uses.

It is an object of the invention to provide a simple and efficient means controlled by the weight of the skins for indicating classification of the skins with reference to their thickness dimensions. It is a further object of the invention to provide means of the character indicated which may be readily assembled with various types of area measuring machines now in commercial use in this and other countries.

To these ends and in accordance with an important feature of the invention there is provided, in connection with an area measuring mechanism and a weighing mechanism for hides or skins, an indicating means arranged to be controlled by both of said mechanisms and calibrated to indicate the thickness dimensions of the work pieces undergoing measurement. Conveniently there is associated with each of said mechanisms an individual indicator member, said members being so constructed and arranged that the indication of the thickness dimensions of the skins is given by the relative positions of said indicating members with respect to each other. In the illustrated embodiment of the invention, the described indicating members are associated with a properly calibrated chart carrying indications by which the operator of the machine may be enabled to read off the thickness dimensions of the hides or skins for purposes of classification.

In the illustrated construction, a receptacle is provided at the delivery end of an area measuring mechanism for receiving each skin in turn following an area measuring operation, the said receptacle being connected to an indicator member movable over an indicator surface similar to a dial, the extent of movement of the indicator member being proportional to the weight of the skin in said receptacle. The area measuring mechanism is connected to operate a similar indicator member movable over the same dial surface in an arrangement wherein said indicator members are arranged at an angle to each other and maintained in angular relationship throughout all of their movements, the arrangement being further such that the point of intersection of said members provides the indication of the thickness dimensions of the various skins. It is to be understood that the dial surface provided with the indicator members carries indications which have been carefully worked out through test measuring operations upon many pieces of work.

In another embodiment of the invention, the functions of the indicator members may be performed by rays of light from sources of illumination controlled respectively by the weighing mechanism for the skins and by the area measuring mechanism, the rays of light crossing each other and being relatively movable with respect to each other in a manner similar to that of the indicating members already described.

It is an advantage of this invention that all portions of each skin being measured contribute to the control of the weighing mechanism since in each case it is the entire skin which is weighed in the illustrated receptacle. It is to be understood in this connection that this measuring operation upon skins is intended to be performed upon the skins when they are in substantially finished condition and commonly ready for sale. Hence these skins have undergone shaving operations or operations similar thereto intended to minimize differences in thickness dimensions of various portions of the same skin. It follows that the thickness dimension of a sheet of material of substantially uniform thickness may be determined by suitable operations based upon calculations involving the area and the weight of such sheet material. Since the weighing mechanism may be of a very simple construction which is substantially uniform in operation and subject to little if any error, under reasonable care and attention, it will be seen that the illustrated machine furnishes a means for measuring the thickness dimensions of skins for purposes of sorting the skins for various uses that will be easy to operate and to maintain in condition to give satisfactory results.

The above described and other important features of the invention and novel combinations of parts will now be described in detail in the specification and then pointed out more particularly in the appended claims.

In the drawings,

Fig. 1 is a view in end elevation of a measuring machine illustrating one embodiment of the invention;

Fig. 2 is a rear end view of the machine shown in Fig. 1;

Fig. 3 is an enlarged view of the indicating means shown at the rear of the machine in Fig. 2;

Fig. 4 is a sectional view along the line IV—IV of Fig. 3, looking in the direction of the arrow;

Fig. 5 is a view of the indicating means of Fig. 3 looking from the right in Fig. 3, parts being broken away and sectioned, to show more clearly the relationship of the indicator members and of the operating means therefor; and Fig. 6 is a detail view similar to that of Fig. 4 showing another embodiment of an indicator member.

In the illustrated machine which is designed particularly for measuring the surface area and the thickness dimension of hides and skins, there is provided a feeding-in table 10 over which the pieces to be measured may be shoved into engagement with a work supporting feed roll 12 which is arranged to be driven at a regular rate of speed by power means which may be applied to a pulley 14 suitably mounted on the shaft of the feed roll 12. Mounted above the feed roll 12 are measuring wheels, one of which is shown at 16. These feed wheels 16 are each supported in slightly spaced relation with respect to the feed roll 12 so as not to be driven thereby when no work piece is in the machine. The wheels 16 are lifted by each piece of work introduced between the measuring wheels and the feed roll 12, the arrangement being such that the measuring wheels insure feeding of the piece by pressing the latter against the feed roll, the measuring wheels being themselves driven through frictional contact with the work piece. When the measuring wheels 16 are lifted by the work piece a pinion 18 carried at the axis of each measuring wheel 16 meshes with teeth on the periphery of a large toothed wheel 20, there being one wheel 20 for each measuring wheel 16. At the axis of the toothed wheel 20 and integral therewith is a circular hub member 22 to which is fastened one end of a cable or a metal ribbon 24 the other end of which is connected to a similar hub 22 on an adjacent toothed wheel 20, and the intermediate portion of which passes over a pulley such as that indicated at 26, the said pulley 26 being carried by one end of an equalizing lever 28, there being a system of pulleys 26 and levers 28 interconnected to serve as a totalizing mechanism and arranged to operate a long lever 30 having an arcuate rack or toothed segment (not shown) in mesh with a pinion (also not shown) on a shaft 32. The shaft 32 carries at one end a pointer 34 which is movable over a dial 36 to indicate the area of the piece of work which has just been passed under the measuring wheels 16. Each of the toothed wheels 20 is locked against reverse movement by a pawl 33, with the result that, at the end of a measuring operation on a given piece of work, all wheels 20 and all of the totalizing mechanism together with the pointer 34 remain locked with the pointer 34 in indicating position. After taking the reading of the pointer, the operator at the front of the machine lifts the handle 35 and thus, through the lever 37 and link 39, trips all of the pawls 33, whereby the parts mentioned are unlocked and returned to initial or normal position. For a more complete disclosure of this well-known "Sawyer" type of an area measuring machine, reference should be had to United States Letters Patent No. 931,144, granted August 17, 1909, upon application of L. O. Ramsdell. It is to be understood that any other form or type of area measuring means may be employed provided it comprises a shaft, such as that shown at 32, which is operated by the totalizing mechanism of the area measuring mechanism.

At its outer end, the shaft 32 of the area measuring mechanism is provided with a wheel 38 to the periphery of which is fastened one end of a bead chain 40, it being understood that a cable or cord may be substituted for the chain. The other end of the chain 40 is fastened to a slide member 42 having a sleeve portion slidable upon a vertically positioned rod 44. Swiveled on the slide member 42 is a sleeve member 46 adapted to receive slidably a rod 48, the lower end of which is secured in a socket member 50 pivotally mounted at 52 in a casing 54. Also secured to the socket member 50 is an indicator member 56 which is movable over the face of a scale or dial member 58, the rod 48 being back of said dial member 58. It will be clear that as the pointer shaft 32 is rotated to move the pointer 34 over the dial 36 to indicate to the operator at the front of the machine the area of the piece of work being measured, the indicator member 56 is correspondingly moved over the dial member 58 through connections which include the bead chain 40 and the slide member 42.

As the piece of work, such as a hide or skin, is fed along under the measuring wheels 16, it passes rearwardly over a delivery table 60 (Figs. 1 and 2) and is ultimately delivered to a pan or other receptacle 62, which is the article-holding element of a weighing mechanism by which the piece of work will be weighed in terms of pounds and ounces. As shown, the receptacle 62 is supported by arms 64 pivotally connected to the outer ends of levers 66 pivotally supported at 68 on the frame of the area measuring machine. Extending between the levers 66 is a rod 68 arranged to pass through an eye in the lower end of a rod 70 connected to a weighing mechanism 72 of a well-known construction. If desired, this weighing mechanism may have a scale such as that shown at 74 (Fig. 2) in a window 76. Also supported by the levers 66 is a second rod 78 upon which is mounted a wheel 80 around which passes a bead chain 82 one end of which is fastened to a bracket 84 secured to a casing member 86. The other end of the bead chain 82 is secured to a slide member 88 (Figs. 2 and 3) having a sleeve portion movable upon a vertically arranged rod 90. Swiveled on the slide member 88 is a sleeve member 92 slidable upon an arm 94 secured to a socket member 96 pivoted at 98 in the casing 54. At its outer end the socket member 96 carries an indicator member 100 which intersects or crosses the other indicator member 56 on the face of the dial member 58, as clearly shown in Figs. 2 and 3. It will be obvious that the heavier the skin or other piece of work in the receptacle 62, the greater will be the movement of the indicator member 100 in a direction upward and to the left in Figs. 2 and 3. Hence, the point of intersection of the indicator members 56 and 100 will be changed for each piece of work. It is also true that, the greater the area of a given work piece, the more the indicator member 56 will be moved upwardly and to the right in Figs. 2 and 3. Hence, a normal skin of large size will be likely to cause the two indicator members 56 and 100 to intersect each other either at a point in the line HM on the dial 58, which means that this skin will be classed as medium heavy, or in the line H which would classify it as heavy. As the indicator members 56 and 100 are shown positioned in Fig. 3, they indicate a skin of a light medium weight, LM. For returning the indicator 100 to initial position at or near the bottom of the dial member 58, there is provided a weighted member 101 secured to or integral with the socket member 96.

In order that the weighing mechanism 72 may give the correct weight of each piece of work placed in the receptacle 62, the said receptacle and the parts connected thereto and moved thereby may be counter-balanced, for instance, by suitable weights adjustable on arms (not shown) extending rearwardly from the inner ends of the levers 66. Alternatively the scale of the weighing mechanism 72 may be suitably calibrated.

In that modification of the invention shown in Fig. 6, intersecting rays of light are substituted for the indicator members 56 and 100 (Fig. 3). Accordingly a lamp 102 is mounted on a socket member 104 corresponding to socket member 50 in Fig. 3. As shown the socket member 104 has mounted therein a rod 106 which is slidably received in a sleeve 108 swiveled on a slide block 110 equivalent in all respects to slide block 42 (Figs. 2 and 3). As shown, the lamp 102 is mounted to project a ray of light along a path in a plane which also passes through the rod 106, just as the rod 48 is in the same plane as the indicator member 56, although it is to be understood that rod 48 and indicator member 56 need not necessarily be parallel to each other. The lamp 102 conveniently contains a light bulb (not shown) and is provided with an opaque closure member 112 having a slot 114 to provide a restricted ray of light projectable along a line on the back of a translucent dial member 116. It is to be understood that the dial member 116 carries indicator lines and characters such as those shown in connection with the dial member 58. It follows that the intersection of the rays of light from the lamps mounted on socket members equivalent to socket members 50 and 96 (Fig. 3) would indicate the classification according to thickness of the pieces of work sent through the combined area measuring and weighing mechanisms.

In operating the machine shown in the drawings a work piece such as a hide or skin is shoved over the feeding-in table 10 while in extended, practically flat, condition and is fed underneath the measuring wheels 16, the latter rotating all of the time during which they engage any portion of the work piece. Progressively with the movement of the piece beneath the measuring wheels, the totalizing mechanism is operating through proper connections to move the pointer 34 over the dial 36 and at the same time the indicator member 56 is moved over the dial member 58 at the back of the machine. As stated above, the measuring mechanism is so constructed that all of the measuring wheels are held locked against reverse movement by pawls, one of which is shown at 33 in Fig. 1, until they are released by the operator lifting the handle 35 of the bell crank lever 37. Hence at the end of an area measuring operation, the pointer 34 and the indicator member 56 are held in their indicating positions. Subsequently the piece of work which has just been measured as to its area is weighed by being placed in receptacle 62. While the actual weight of the hide or skin may be ascertained by inspection of the scale at 74 (Fig. 2), this is done only occasionally, as a matter of checking up on the machine. Accompanying the movement of the indicator means of the weighing device 72, there is a corresponding movement of the indicator member 100 (Figs. 2 and 3) which moves to its indicating position and stays there so long as the hide or skin is in the receptacle 62. Hence, the thickness dimension of the hide or skin may be readily ascertained by observing the position of the intersecting point of the indicator members 56 and 100, or of the equivalent light rays, on the scale or dial member 58. The operator at the back of the machine will mark on each individual hide or skin the area as given to him by the operator at the front of the machine and then will place that hide or skin on the proper pile according to its thickness dimension as indicated by the position of the intersection of the indicator members 56 and 100 on the dial member 58. It will be understood that a certain amount of discretion must be exercised by the worker at the back of the machine since the point of intersection of the indicator members 56 and 100 will rarely coincide with one of the lines marked L, LM, M, etc. However, the results are apt to be more uniformly accurate than is the case where the determination of thickness of hides or skins is left entirely to hand sorters who depend upon the sensitiveness of their fingers in classifying the pieces of work according to thickness.

Having described my invention, what I claim as new and desire to secure by Letters Patent of the United States is:

1. In a machine for ascertaining the thickness dimensions of sheet material of uniform or substantially uniform thickness, an area measuring mechanism, a weighing mechanism, and movable indicator members responsive respectively to said mechanisms, one mounted in overlying intersecting relation to the other, and arranged to move relatively to each other to indicate by their point of intersection on a prepared chart the thickness dimension of the sheet material which has just undergone both area measuring and weighing operations by said mechanisms.

2. In a machine for ascertaining thickness dimensions of sheet material of uniform or substantially uniform thickness, an area measuring mechanism, a weighing mechanism, a scale, indicator means, and connections between the last-mentioned means and said mechanisms by which the latter operate the indicator means with relation to said scale to indicate the thickness dimension of the piece of work which has just undergone area measuring and weighing operations by said mechanisms.

3. In a machine for ascertaining thickness dimensions of sheet material of uniform or substantially uniform thickness, an area measuring mechanism, a weighing mechanism, and two movable indicator members, each of said mechanisms having one of said members responsive thereto, and the indicator members being arranged so that one moves in overlying intersecting relation to the other whereby a point on the overlying indicator member comes finally into alinement with a point on the overlain indicator member to indicate on a prepared chart the thickness dimension of the piece of work which has just undergone area measuring and weighing operations by said mechanisms.

4. In a machine for weighing hides and skins, an area measuring mechanism, a weighing mechanism, and indicator members responsive respectively to said mechanisms, pivotally mounted in intersecting relationship with respect to each other, and both arranged to move relatively to each other to indicate by their point of intersection on a prepared chart the thickness dimension of the hide or skin undergoing both area measuring and weighing operations.

5. In a machine for ascertaining thickness dimensions of hides and skins, an area measuring mechanism, a weighing mechanism, a dial member, and indicator members, one associated with each of said mechanisms to be controlled thereby, said indicator members being arranged to move over the surface of the dial member in intersecting relationship and by their point of intersection to indicate on the dial member the thickness dimension of the piece of work which has just undergone area measuring and weighing operations.

6. In a machine for ascertaining the thickness dimensions of hides and skins, an area measuring mechanism, a weighing mechanism to receive and weigh a skin which has passed through the area measuring mechanism, a dial member, an indicator member responsive to the area measuring mechanism and movable over the dial member, and a second indicator member responsive to the weighing mechanism and mounted to move over the dial member in intersecting relation to the first-mentioned indicator member, the arrangement being such that the point of intersection of said indicator members indicates on the dial member the thickness dimension of the skin which has just undergone area measuring and weighing operations.

7. In a machine for weighing hides and skins, an area measuring mechanism, a weighing mechanism, a dial member, a pivotally mounted indicator member operated by said weighing mechanism to move over the surface of the dial, and another similarly mounted indicator member operated by said measuring mechanism to move over said dial in a direction opposite to that of the first-mentioned indicator member, said members being arranged to intersect each other, and the point of intersection serving to indicate the thickness of the hide or skin undergoing both area measuring and weighing operations.

8. In a machine for ascertaining thickness dimensions of hides and skins, an area measuring mechanism, a weighing mechanism, a dial member, indicator members, one associated with each of said mechanisms, said indicator members being pivotally mounted at one of their ends and arranged in intersecting relation to each other, operating members for the indicator members arranged so that the former are slidably connected individually with respect to the latter, guideways for said operating members, and connections between said operating members and said mechanisms by which the former are individually adjusted along their guideways by the latter, whereby the indicator members are caused to move over the surface of the dial member and by their intersection point to indicate the thickness dimension of the piece of work which has just undergone area measuring and weighing operations.

ERASTUS E. WINKLEY.